United States Patent
Rüdiger et al.

(10) Patent No.: US 7,652,082 B2
(45) Date of Patent: Jan. 26, 2010

(54) COMPOSITIONS CONTAINING POLYCARBONATE AND NOVEL UV ABSORBERS

(75) Inventors: Claus Rüdiger, Krefeld (DE); Frank Buckel, Krefeld (DE); Peter Schwarz, Krefeld (DE); Jürgen Röhner, Köln (DE); Tanja Grüter-Reetz, Krefeld (DE)

(73) Assignee: BASF SE, Ludwigshafen (DE)

( * ) Notice: Subject to any disclaimer, the term of this patent is extended or adjusted under 35 U.S.C. 154(b) by 176 days.

(21) Appl. No.: 11/512,496

(22) Filed: Aug. 30, 2006

(65) Prior Publication Data
US 2007/0054991 A1    Mar. 8, 2007

(30) Foreign Application Priority Data
Sep. 3, 2005    (DE)    ........................ 10 2005 041 952

(51) Int. Cl.
*C08K 5/3492*    (2006.01)
*C08K 5/524*    (2006.01)
*C08K 5/51*    (2006.01)
*C08K 5/10*    (2006.01)

(52) U.S. Cl. ........................ 524/100; 524/129; 524/153; 524/315; 428/412

(58) Field of Classification Search ................ 524/100, 524/129, 153, 315; 428/412
See application file for complete search history.

(56) References Cited

U.S. PATENT DOCUMENTS

| | | | | |
|---|---|---|---|---|
| 4,707,393 | A | 11/1987 | Vetter | 428/178 |
| 5,108,835 | A | 4/1992 | Hähnsen et al. | 428/334 |
| 6,255,483 | B1 * | 7/2001 | Fletcher et al. | 544/216 |
| 6,960,623 | B2 * | 11/2005 | Gorny et al. | 524/100 |
| 2004/0209020 | A1 | 10/2004 | Castiglione et al. | 428/34 |
| 2005/0031855 | A1 | 2/2005 | Heuer et al. | 428/332 |

FOREIGN PATENT DOCUMENTS

| EP | 110 221 | B1 | 4/1987 |
|---|---|---|---|
| EP | 0 826 675 | A1 | 3/1998 |
| EP | 1 308 084 | A1 | 5/2003 |
| GB | 2 290 745 | A | 1/1996 |

* cited by examiner

*Primary Examiner*—Kriellion A Sanders
(74) *Attorney, Agent, or Firm*—Connolly Bove Lodge & Hutz LLP

(57) ABSTRACT

A thermoplastic compositions containing polycarbonate and a UV absorbing compound conforming to Formula 1

Formula 1

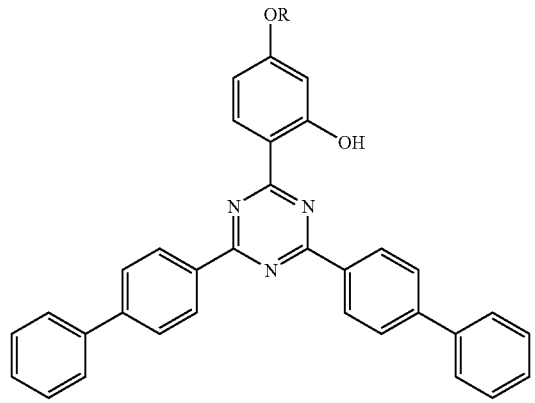

wherein R denotes a branched or unbranched alkyl group with 4 to 10 carbon atoms is disclosed. The composition is suitable for making molded or extruded articles, including multilayered articles exhibiting improved weatherability.

11 Claims, No Drawings

COMPOSITIONS CONTAINING POLYCARBONATE AND NOVEL UV ABSORBERS

FIELD OF THE INVENTION

The present invention relates to thermoplastic molding compositions and in particular to compositions containing polycarbonate.

TECHNICAL BACKGROUND OF THE INVENTION

Shaped articles made of polycarbonate have already been known for some time. Polycarbonate sheets are known from EP A 0 110 221, for example, and are prepared for a large number of applications. The sheets are produced e.g. by extruding compositions that contain polycarbonate. Coextrusion with other compositions that contain polycarbonate and, in addition, a relatively high proportion of UV absorbers may optionally take place. However, polycarbonate has the disadvantage that it is not itself inherently UV-stable. The sensitivity curve of bisphenol A based polycarbonate exhibits the highest sensitivity between 320 nm and 330 nm. Below 300 nm, hardly any solar radiation reaches the earth and above 350 nm, the sensitivity of polycarbonate is so low that yellowing no longer takes place to any significant extent.

To protect polycarbonate from the harmful effect of UV rays in the atmosphere, UV stabilizers are generally employed, which absorb the UV radiation and convert it into harmless thermal energy.

It is advantageous for lasting protection if the harmful UV radiation is effectively filtered out before it reaches the polycarbonate surface, which is possible by using UV protective layers, e.g. coextruded layers containing UV absorbers, films containing UV absorbers or paints containing UV absorbers, on polycarbonate.

Another very important property is the protection of polycarbonate products, particularly polycarbonate sheets, from UV light in exterior applications. For this purpose, a polycarbonate outer layer in thicknesses of 10 to 200 μm, preferably 20 to 100 μm, particularly preferably 20 to 60 μm, containing relatively high concentrations of UV absorbers, generally of between 0.5 and 15 wt. % UV absorbers, is applied on to polycarbonate sheets (solid, corrugated and multi-wall sheets) in a coextrusion process.

EP A 0 320 632 describes coextruded sheets comprising compositions containing polycarbonate, which contain a UV absorber and may contain a lubricant. It is disadvantageous that, with a prolonged period of extrusion, the surface of the sheets is disadvantageously affected by evaporations from the melt of the composition, particularly in the case of coextrusion.

A recurring problem in the extrusion of these sheets is the settling out of volatile components from the composition on the calibrating unit (in the case of multi-wall sheets) or on the rollers (in the case of solid sheets), which may lead to surface defects on the sheets. Volatile components are e.g. UV absorbers, mold release agents and other low-molecular-weight components of the composition. The increased evaporation of the UV absorber from the melt of the coextrusion layer leads to the formation of a deposit on the calibrating unit or the rollers, and ultimately to the formation of defects on the surface of the sheets (e.g. white patches, waviness etc.). In addition, polycarbonate abrasion on the calibrating unit leads to powdery deposits on the polycarbonate sheets.

The conventional UV absorbers used are preferably selected from the group consisting of (bis[2-hydroxy-5-tert.-octyl-3-(benzotriazol-2-yl)phenyl]methane), 2-(4,6-diphenyl-1,3,5-triazin-2-yl)-5-(hexyl)oxy phenol and 2-cyano-3,3-diphenylpropenoic acid 2,2-bis[(2-cyano-1-oxo-3,3-diphenyl-2-propenyl)oxy]-methyl-1,3-propanediyl ester.

The present invention is based on the object of, on the one hand, improving the coextrusion production process for the multi-layer products described in such a way that the cleaning intervals for the calibrating plates (multi-wall sheet extrusion) and rollers (solid sheet extrusion) are as great as possible; and on the other hand, improving the weathering resistance of the multi-layer products produced.

An improvement in weathering resistance is shown e.g. by a smaller increase in the yellowness index YI after artificial ageing.

SUMMARY OF THE INVENTION

A thermoplastic compositions containing polycarbonate and a UV absorbing compound conforming to formula 1

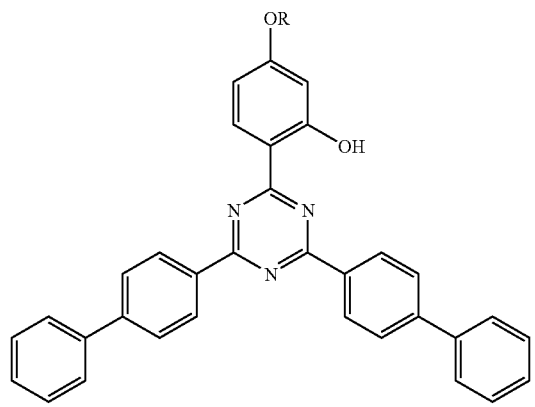

Formula 1 wherein R denotes a branched or unbranched alkyl group with 4 to 10 carbon atoms is disclosed. The composition is suitable for making molded or extruded articles, including multilayered articles exhibiting improved weatherability.

DETAILED DESCRIPTION OF THE INVENTION

The object described above is surprisingly achieved by a composition containing polycarbonate and a compound of formula 1

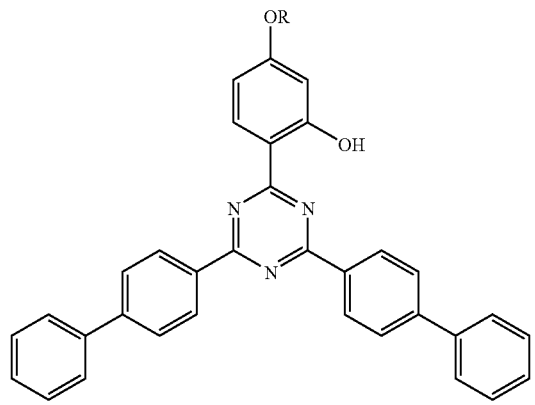

Formula 1 wherein R denotes a branched or unbranched alkyl group with 4 to 10 carbon atoms.

R preferably denotes a branched alkyl group, particularly preferably 2-ethylhex-1-yl.

The compositions according to the invention generally contain 0.01 to 15 parts by weight, preferably 0.5 to 8 parts by weight, particularly preferably 1 to 5 parts by weight, especially preferably 1.25 to 3.5 parts by weight, of UV absorbers of formula 1, based in each case on 100 parts by weight of polycarbonate.

Thermoplastic aromatic polycarbonates for the compositions according to the invention are homopolycarbonates, copolycarbonates and thermoplastic polyester carbonates. They preferably have weight average molecular weights, $\overline{M}_w$, of 18 000 to 40 000 g/mole, more preferably of 26 000 to 36 000 g/mole and especially of 28 000 to 35 000 g/mole, determined by measuring the relative solution viscosity in dichloromethane or in mixtures of equal weights of phenol/o-dichlorobenzene calibrated by light scattering.

The melt viscosity of the compositions should preferably be lower than that of the substrate on to which they are applied when multi-layer products are being produced.

For the production of polycarbonates for the compositions according to the invention, reference is made, by way of example, to "Schnell", Chemistry and Physics of Polycarbonates, Polymer Reviews, vol. 9, Interscience Publishers, New York, London, Sydney 1964, to D. C. PREVORSEK, B. T. DEBONA and Y. KESTEN, Corporate Research Center, Allied Chemical Corporation, Moristown, N.J. 07960, "Synthesis of Poly(ester)carbonate Copolymers" in Journal of Polymer Science, Polymer Chemistry Edition, vol. 19, 75-90 (1980), to D. Freitag, U. Grigo, P. R. Muiller, N. Nouvertne, BAYER AG, "Polycarbonates" in Encyclopedia of Polymer Science and Engineering, vol. 11, second edition, 1988, pages 648-718, and finally to Drs. U. Grigo, K. Kircher and P. R. Müller, "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299. Production preferably takes place by the interfacial polycondensation process or the melt transesterification process.

Compounds preferably to be used as starting compounds are aromatic dihydroxy compounds of the general formula HO-Z-OH, wherein Z is a divalent organic residue with 6 to 30 carbon atoms, which contains one or more aromatic groups. Examples of these compounds are bisphenols belonging to the group of the dihydroxydiphenyls, bis(hydroxyphenyl)alkanes, indanebisphenols, bis(hydroxyphenyl) ethers, bis(hydroxyphenyl) sulfones, bis(hydroxyphenyl) ketones and $\alpha,\alpha'$-bis(hydroxyphenyl) diisopropylbenzenes.

Particularly preferred bisphenols belonging to the above-mentioned groups of compounds are bisphenol A, tetraalkylbisphenol A, 4,4-(meta-phenylene-diisopropyl)diphenol (bisphenol M), 4,4-(para-phenylenediisopropyl)diphenol, 1,1-bis(4-hydroxyphenyl)-3,3,5-trimethylcyclohexane (BP-TMC) and optionally mixtures thereof. Homopolycarbonates based on bisphenol A and copolycarbonates based on the monomers bisphenol A and 1,1-bis(4-hydroxyphenyl)-3,3,5-trimethylcylohexane are particularly preferred. The bisphenol compounds to be used according to the invention are reacted with carbonic acid compounds, particularly phosgene or, in the melt transesterification process, diphenyl carbonate or dimethyl carbonate.

Polyester carbonates are obtained by reacting the bisphenols already mentioned, at least one aromatic dicarboxylic acid and optionally carbonic acid equivalents. Suitable aromatic dicarboxylic acids are e.g. phthalic acid, terephthalic acid, isophthalic acid, 3,3'- or 4,4'-diphenyldicarboxylic acid and benzophenone-dicarboxylic acids. Part, up to 80 mole %, preferably from 20 to 50 mole %, of the carbonate groups in the polycarbonates may be replaced by aromatic dicarboxylic acid ester groups.

Inert organic solvents used in the interfacial polycondensation process are e.g. dichloromethane, the various dichloroethanes and chloropropane compounds, tetrachloromethane, trichloromethane, chlorobenzene and chlorotoluene. Chlorobenzene or dichloromethane, or mixtures of dichloromethane and chlorobenzene, are preferably used.

The interfacial polycondensation reaction may be accelerated by catalysts, such as tertiary amines, particularly N-alkylpiperidines or onium salts. Tributylamine, triethylamine and N-ethylpiperidine are preferably used. In the case of the melt transesterification process, the catalysts mentioned in DE-A 42 38 123 are used.

The polycarbonates may be branched in a controlled manner by using small quantities of branching agents. Suitable branching agents include: phloroglucinol, 4,6-dimethyl-2,4,6-tri(4-hydroxyphenyl)heptene-2; 4,6-dimethyl-2,4,6-tri(4-hydroxyphenyl)heptane; 1,3,5-tri(4-hydroxyphenyl)benzene; 1,1,1-tri(4-hydroxyphenyl)ethane; tri(4-hydroxyphenyl)phenylmethane; 2,2-bis[4,4-bis(4-hydroxyphenyl)cyclohexyl]propane; 2,4-bis(4-hydroxyphenylisopropyl)phenol; 2,6-bis(2-hydroxy-5'-methylbenzyl)-4-methylphenol; 2-(4-hydroxyphenyl)-2-(2,4-dihydroxyphenyl)propane; hexa(4-(4-hydroxyphenylisopropyl)phenyl) orthoterephthalate; tetra(4-hydroxyphenyl)methane; tetra(4-hydroxyphenylisopropyl)phenoxy)methane; $\alpha,\alpha',\alpha''$-tris(4-hydroxyphenyl)-1,3,5-triisopropylbenzene; 2,4-dihydroxybenzoic acid; trimesic acid; cyanuric chloride; 3,3-bis(3-methyl-4-hydroxyphenyl)-2-oxo-2,3-dihydroindole; 1,4-bis(4',4"-dihydroxytriphenyl)methyl)benzene and especially 1,1,1-tri(4-hydroxyphenyl)ethane and bis(3-methyl-4-hydroxyphenyl)-2-oxo-2,3-dihydroindole.

The optionally incorporated 0.05 to 2 mole %, based on diphenols used, of branching agents or mixtures of branching agents may be used together with the diphenols but may also be added at a later stage of the synthesis.

Chain terminators may be used. Phenols, such as phenol, alkylphenols, such as cresol and 4-tert.-butylphenol, chlorophenol, bromophenol, cumylphenol or mixtures thereof are preferably used as chain terminators in quantities of 1-20 mole %, preferably 2-10 mole % per mole of bisphenol. Phenol, 4-tert.-butylphenol and cumylphenol are preferred.

Chain terminators and branching agents may be added to the syntheses separately or together with the bisphenol.

Bisphenol A homopolycarbonate is the preferred polycarbonate according to the invention.

The incorporation of the UV absorbers into the compositions according to the invention that are to be used takes place by conventional methods, e.g. by mixing solutions of the UV absorbers with solutions of the plastics in suitable organic solvents, such as $CH_2Cl_2$, halogen alkanes, halogen aromatics, chlorobenzene and xylenes. The substance mixtures are then homogenised in a known manner by extrusion; the solution mixtures are removed in a known manner by evaporation of the solvent and subsequent extrusion, e.g. compounded.

The compositions according to the invention may contain other conventional processing auxiliaries, particularly other mold release agents and free-flow agents.

Suitable mold release agents (lubricants) are in particular pentaerythritol tetrastearate and substances of the formula

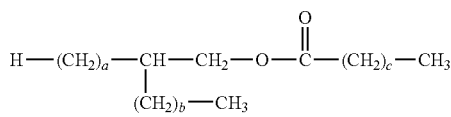

wherein a=0 to 20, b=1 to 25 and c=10 to 40.

The compositions according to the invention may contain conventional stabilizers for polycarbonates, particularly conventional heat stabilizers.

Suitable stabilizers for the polycarbonates for the compositions according to the invention are e.g. phosphines, phosphites or Si-containing stabilizers and other compounds described in EP-A 0 500 496. Triphenyl phosphites, diphenylalkyl phosphites, phenyldialkyl phosphites, tris(nonylphenyl) phosphite, tetrakis(2,4-di-tert.-butylphenyl)-4,4'-biphenylene diphosphonite and triaryl phosphite may be mentioned as examples. Triphenylphosphine and tris(2,4-di-tert.-butylphenyl) phosphite are particularly preferred.

Examples of antistatic agents are cationic compounds, e.g. quaternary ammonium, phosphonium or sulfonium salts, anionic compounds, e.g. alkyl sulfonates, alkyl sulfates, alkyl phosphates, carboxylates in the form of alkali metal or alkaline earth metal salts, non-ionogenic compounds, e.g. polyethylene glycol esters, polyethylene glycol ethers, fatty acid esters and ethoxylated fatty amines. Preferred antistatic agents are non-ionogenic compounds.

All the feed materials and solvents employed for the synthesis of the compositions according to the invention may be contaminated with corresponding contaminants from their production and storage, the aim being to work with starting substances that are as free of contaminants as possible.

The individual constituents may be mixed by known means, both successively and simultaneously, and both at ambient temperature and at elevated temperature.

The additives are preferably incorporated into the compositions according to the invention in a known manner, by mixing polymer pellets with the additives at temperatures of about 200 to 330° C. in conventional units such as internal mixers, single-screw extruders and twin-screw extruders, e.g. by melt compounding or melt extrusion, or by mixing the solutions of the polymer with solutions of the additives and subsequent evaporation of the solvents in a known manner. The proportion of additives in the composition may be varied within broad limits and depends on the desired properties of the molding composition. The total proportion of additives in the composition is up to about 20 wt. %, preferably 0.2 to 12 wt. %, based on the weight of the compositions.

The present invention also provides products containing the composition according to the invention.

The present invention also provides multi-layer products containing at least one layer consisting of a composition according to the invention.

One possible embodiment of this aspect of the present invention is formed by a multi-layer product comprising a first layer (A) and a second layer (B), wherein the first layer (A) is a UV protection layer made of polycarbonate, which contains a UV stabilizer conforming to formula (I), and the second layer (B) contains polycarbonate. This UV protection layer (A) may take the form of a film or a coextruded layer.

A preferred embodiment of the present invention is formed by multi-layer sheets of at least three layers, one or both of the outer layers, i.e. the layers facing the light source, consisting of a composition (A) according to the invention.

These multi-layer products are preferably produced by coextrusion. Coextrusion per se is known (cf. e.g. EP-A 0 110 221 and EP-A 0 110 238). In the present case, the preferred procedure is as follows:

Extruders for the production of the core layer and outer layer(s) are connected to a coextrusion adapter. The adapter is designed such that the melt forming the outer layer(s) is applied as a thin layer adhering to the melt of the core layer.

The multi-layer melt strand thus produced is then brought to the desired shape (multi-wall or solid sheet) in the die connected downstream. The melt is then cooled under controlled conditions in a known manner by calendering (solid sheet) or vacuum calibration (multi-wall sheet) and then cut into lengths. A conditioning oven may optionally be connected downstream of the calibration to relieve stresses. Instead of the adapter connected upstream of the die, the die itself may also be designed such that the melts are brought together there.

The products according to the invention have proved particularly advantageous in their long-term coextrusion characteristics. They may be processed without any problems and display distinctly lower deposit formation on the calibrating plates (multi-wall sheet extrusion) or rollers (solid sheet extrusion) during production.

The products according to the invention have also proved particularly advantageous in the weathering test. They do not exhibit any drawbacks in the products obtained from the production. The weathering resistance of the coextruded polycarbonate sheets is distinctly better, even with relatively small concentrations of a UV absorber of formula 1, than when a standard UV absorber, Tinuvin 360® absorber is used.

The compositions and (optionally multi-layer) products according to the invention enable shaped articles, particularly sheets and products made therefrom, such as e.g. glazing for greenhouses, conservatories, bus shelters, advertising boardings, signs, safety screens, car glazing, windows and roofing, to be produced.

Subsequent treatments of the products coated with the composition according to the invention, such as e.g. thermoforming, or surface treatments, such as e.g. application of scratch-resistant coatings, water-spreading layers and similar, are possible and the products produced by these processes are also provided by the invention.

The invention is explained further by the following example.

EXAMPLE 10 mm twin-wall sheets with the layer construction A-B, as described for example in EP-A 0 110 238 (U.S. Pat. No. 4,707,393 incorporated herein by reference), were obtained from the following compositions: Makrolon® 1243 polycarbonate (branched bisphenol A polycarbonate from Bayer AG, Leverkusen, with a melt flow index (MFR) according to ISO 1133 of 6.5 g/10 min at 300° C. and 1.2 kg load) was used as the base material B. This was coextruded with the compounds based on Makrolon® 3108 polycarbonate (linear bisphenol A polycarbonate from Bayer AG, Leverkusen, with a melt flow index (MFR) according to ISO 1133 of 6.5 g/10 min at 300° C. and 1.2 kg load) given in Table 1. The thickness of the coextruded layer was about 50 µm in each case.

In addition to the UV absorber, all the examples contain 0.25% pentaerythritol tetrastearate (PETS, commercially available, Loxiol® VPG 861 plasticizer from Cognis, Düsseldorf, Germany).

TABLE 1

| Sheet | UV absorber |
|---|---|
| A | 5% formula 1b |
| B | 2.5 formula 1b |
| C | 1.25 formula 1b |
| D | 10% Tinuvin 360 |
| E | 7% Tinuvin 360 |
| F | 5% Tinuvin 360 |

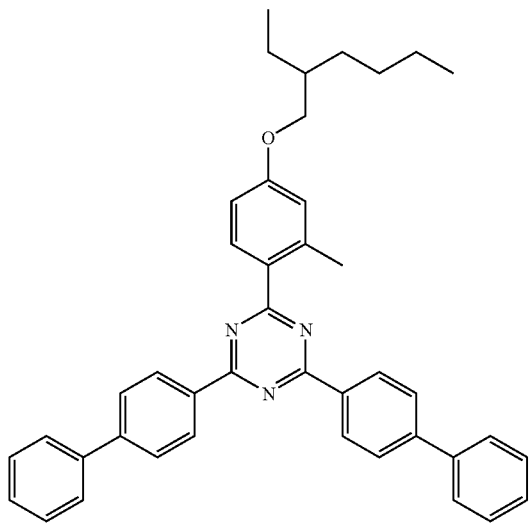

Formula 1b: Ciba CGX UVA 006 ®

The machines and apparatus used to produce multi-layer multi-wall sheets are described below.

The equipment consisted of:
the main extruder with a screw with a length of 33 D and a diameter of 70 mm with vent
the coex adapter (feedblock system)
a coextruder for applying the outer layer with a screw with a length of 25 D and a diameter of 30 mm
the special sheet die with a width of 350 mm
the calibrating unit
the roller table
the take-off unit
the cutting device (saw)
the stacking table.

The polycarbonate pellets of the base material were fed into the feed hopper of the main extruder and the UV coextrusion material to that of the coextruder. The materials were melted and conveyed in the respective barrel/screw plasticizing systems. The two material melts were brought together in the coex adapter and, after leaving the die and being cooled in the calibrating unit, formed a composite. The rest of the equipment served to transport, cut and stack the extruded sheets.

Evaluation of the Coextrusion Characteristics
Coextrusion with A:
low deposit formation on the calibrating plates after 5 h
very low transverse waviness with insignificant impairment after 5 h
score: very good
Coextrusion with B:
low deposit formation on the calibrating plates after 5 h
very low transverse waviness with insignificant impairment after 5 h
score: very good
Coextrusion with C:
low deposit formation on the calibrating plates after 5 h
very low transverse waviness with insignificant impairment after 5 h
score: very good
Coextrusion with D:
very heavy deposit formation on the calibrating plates after 5 h, first deposits on the calibrating plates after only 45 min.
transverse waves occurring at irregular intervals after 2 h, having a negative effect on the sheet quality
score: poor
Coextrusion with E:
deposit formation on the calibrating plates after 5 h
increasing transverse waves over the 5 h test period, having a slight negative effect on the sheet quality
score: moderate
Coextrusion with F:
deposit formation on the calibrating plates after 5 h
increasing transverse waves over the 5 h test period, having a slight negative effect on the sheet quality
score: moderate The weathering of the sheets A to F produced as described above took place in an Atlas Ci 65 A Weatherometer with an irradiation intensity of 0.5 W/m$^2$ at 340 nm and a dry/spray cycle of 102:18 minutes. The black panel temperature was 65° C., the sample chamber temperature 42° C. and the relative humidity 65±5%.

The change in the yellowness index ($\Delta$YI) as a function of the weathering period is shown in Table 2 below:

TABLE 2

| | Time in h | | | | | | |
|---|---|---|---|---|---|---|---|
| Example | 0 | 700 | 1400 | 2100 | 2800 | 3500 | 4200 |
| A | 0.0 | −0.1 | 0.3 | 0.5 | 0.5 | 1.1 | 0.9 |
| B | 0.0 | 0.7 | 1.7 | 1.7 | 1.8 | 2.6 | 2.5 |
| C | 0.0 | 1.3 | 2.4 | 2.4 | 2.4 | 3.1 | 3.0 |
| D | 0.0 | 0.8 | 1.4 | 1.5 | 1.4 | 2.1 | 2.3 |
| E | 0.0 | 0.8 | 1.7 | 1.8 | 1.8 | 3.0 | 2.9 |
| F | 0.0 | 0.8 | 2.3 | 2.2 | 2.5 | 3.4 | 3.6 |

It is impressively demonstrated in Examples A to F that, compared with the standard Tinuvin 360®, the UV batches with the UV absorber of formula 1 are processed significantly more readily and multi-wall sheets with improved optical quality are produced. The deposit formation on the calibrating plates is visibly reduced compared with the UV batches with Tinuvin 360®. This is shown particularly when comparing Example A with Example F.

In addition, the products according to the invention have proved particularly advantageous in the weathering test. The weathering stability of the coextruded polycarbonate sheets is distinctly better, even with relatively small concentrations of the UV absorber of formula 1, than with the standard UV absorber Tinuvin 360®.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic composition comprising polycarbonate and a UV stabilizing compound of the formula

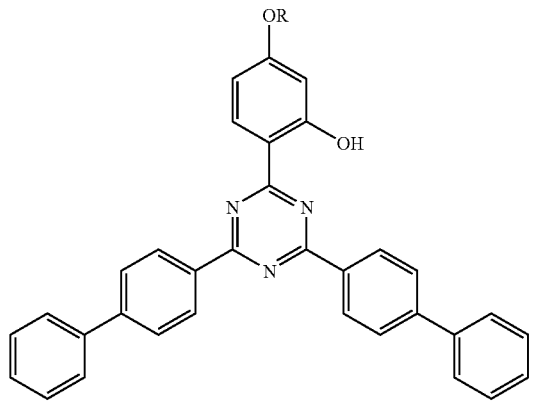

wherein R is 2-ethylhexyl.

2. The composition according to claim 1 wherein said compound is present in an amount of 0.01 to 15 parts by weight based on 100 parts of polycarbonate.

3. The composition according to claim 2, further comprising 10 to 3000 ppm of a heat stabilizer based on the total mass of the composition.

4. The composition according to claim 3, wherein the heat stabilizer is a member selected from the group consisting of tris(2,4,-di-tert.-butylphenyl) phosphite and triphenylphosphine.

5. The composition according to claims 2 further containing 200 to 3000 ppm of a lubricant.

6. The composition according to claim 5 wherein the lubricant is at least one member selected from the group consisting of pentaerythritol tetrastearate and a compound conforming to the formula

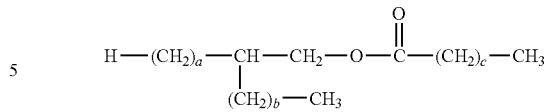

wherein a=0 to 20, b=1 to 25 and c=10 to 40.

7. A shaped product containing the composition of claim 1.

8. A shaped product comprising at least one layer containing the composition according to claim 1.

9. A shaped product in the form of a multi-layered sheet containing at least three layers, wherein at least one outer layer contains the composition according to claim 1.

10. The product according to claim 7, comprising a layer (A) and a layer (B), wherein layer (A) contains polycarbonate and a UV stabilizing compound conforming to formula (I)

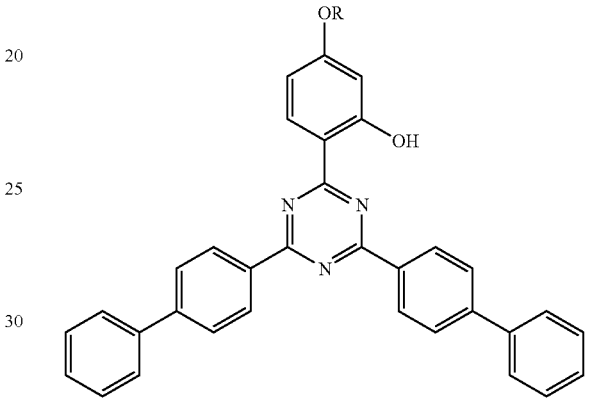

wherein R denotes a branched or unbranched alkyl group with 4 to 10 carbon atoms and layer (B) contains polycarbonate.

11. The product according to claim 8, selected from the group consisting of glazing, greenhouses, conservatories, bus shelters, advertising hoardings, signs, safety screens, car glazing, windows, roofing, solid sheets, corrugated sheets, multi-wall sheets and multi-wall profiles.

* * * * *